(12) United States Patent
Lenga et al.

(10) Patent No.: US 12,475,569 B2
(45) Date of Patent: Nov. 18, 2025

(54) METHODS AND SYSTEMS FOR SEGMENTING IMAGES

(71) Applicant: KONINKLIJKE PHILIPS N.V., Eindhoven (NL)

(72) Inventors: Matthias Lenga, Mainz (DE); Christian Buerger, Hamburg (DE); Steffen Renisch, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 308 days.

(21) Appl. No.: 17/770,307

(22) PCT Filed: Oct. 22, 2020

(86) PCT No.: PCT/EP2020/079679
§ 371 (c)(1),
(2) Date: Apr. 20, 2022

(87) PCT Pub. No.: WO2021/078823
PCT Pub. Date: Apr. 29, 2021

(65) Prior Publication Data
US 2022/0398740 A1 Dec. 15, 2022

(30) Foreign Application Priority Data
Oct. 23, 2019 (EP) .................................... 19204772

(51) Int. Cl.
*G06T 7/149* (2017.01)
*G06T 7/50* (2017.01)
*G06V 10/46* (2022.01)
*G06V 10/82* (2022.01)

(52) U.S. Cl.
CPC ................ *G06T 7/149* (2017.01); *G06T 7/50* (2017.01); *G06V 10/46* (2022.01); *G06V 10/82* (2022.01);
(Continued)

(58) Field of Classification Search
CPC . G06T 7/149; G06T 7/50; G06T 2207/20081; G06T 2207/20084;
(Continued)

(56) References Cited

U.S. PATENT DOCUMENTS 6,745,169 B1 * 6/2004 Schlang .................. B21B 37/00
706/16
2013/0070990 A1 * 3/2013 Martel .................... G06T 7/143
382/131
(Continued)

FOREIGN PATENT DOCUMENTS

CN          108898606 A       11/2018
WO      WO2018015414 A1       1/2018

OTHER PUBLICATIONS

Fauser et al. âPreoperative Planning for Guidewires Employing Shape Regularized Segmentation and Optimized Trajectoriesâ, Department of Computer Science, Darmstadt, Germany (Year: 2019).*
(Continued)

*Primary Examiner* — Stephen P Coleman

(57) ABSTRACT

In a method of segmenting a feature in an image, an image product related to the image is provided (102) to a model trained using a machine learning process. An indication of a shape descriptor for the feature in the image is received (104) from the model, based on the image product. The indicated shape descriptor is then used (106) in a model based segmentation, MBS, to initialize the MBS and segment the feature.

16 Claims, 6 Drawing Sheets

(52) U.S. Cl.
CPC .............. *G06T 2207/20081* (2013.01); *G06T 2207/20084* (2013.01)

(58) Field of Classification Search
CPC ........ G06T 2207/30004; G06T 7/0012; G06V 10/46; G06V 10/82; G06N 3/08
USPC ........................................................ 382/157
See application file for complete search history.

(56) References Cited

U.S. PATENT DOCUMENTS

| | | |
|---|---|---|
| 2017/0109881 A1 | 4/2017 | Avendi |
| 2018/0122082 A1 | 5/2018 | Mukherjee |
| 2018/0260759 A1* | 9/2018 | Bencke ..................... G06T 7/10 |
| 2018/0322637 A1 | 11/2018 | Ghesu |
| 2019/0205606 A1 | 7/2019 | Zhou |

OTHER PUBLICATIONS

PCT International Search Report, International application No. PCT/EP2020/079679, Dec. 22, 2020.

Fauser J. et al., "Preoperative Planning for Guidewires Employing Shape-Regularized Segmentation and Optimized Trajectories", Oct. 7, 2019 (Oct. 7, 2019), 12th European Conference on Computer Vision, ECCV 2012; [Lecture Notes in Computer Science], Springer Berlin Heidelberg, Berlin Germany, pp. 12-20, XP047524562.

Ecabert O. et al., "Automatic Model-Based Segmentation of the Heart in CT Images", IEEE Transactions on Medical Imaging, vol. 27, No. 9, Sep. 1, 2008, pp. 1189-1201, XP002768335.

Dong S. et al., "Combined Fully Convolutional Networks and Deformable Model for Automatic Left Venbtricle Segmentation Based on 3D Echocardiography", BioMed Research International, vol. 2018, Article ID 5682365, 16 pages.

Tsechpenakis G. et al., "Deformable Model-Based Medical Image Segmentation", Multi Modality State-of-the-Art Medical Image Segmentation and Registration Methodologies, Springer, pp. 33-67, Apr. 2011.

Ruppertshofen H. et al., "Discriminative Generalized Hough Transform for Object Localization in Medical Images", International Journal of Computer Assisted Radiology and Surgery, 8(4), 593-606, 2013.

* cited by examiner

METHODS AND SYSTEMS FOR SEGMENTING IMAGES

CROSS-REFERENCE TO PRIOR APPLICATIONS

This application is the U.S. National Phase application under 35 U.S.C. § 371 of International Application No. PCT/EP2020/079679, filed on Oct. 22, 2020, which claims the benefit of European Application No. 19204772.8.7, filed on Oct. 23, 2019. These applications are hereby incorporated by reference herein.

FIELD OF THE INVENTION

Embodiments herein relate to image processing. Particularly but non-exclusively, embodiments herein relate to segmenting one or more features of an image.

BACKGROUND OF THE INVENTION

This disclosure lies in the field of image segmentation. The disclosures herein may be applied to a diverse range of images, such as for example, medical images. Image segmentation involves extracting shape/form information about the objects or shapes captured in an image. This may be achieved by converting the image into constituent blocks or "segments" that represent the different features in the image. In some methods, image segmentation may comprise fitting a model to one or more features in an image.

One method of image segmentation is Model-Based Segmentation (MBS), whereby a triangulated mesh of a target structure (such as, for example, a heart, brain, lung etc.) is adapted in an iterative fashion to features in an image. Segmentation models typically encode population-based appearance features and shape information. Such information describes permitted shape variations based on real-life shapes of the target structure in members of the population. Shape variations may be encoded, for example, in the form of Eigenmodes which describe the manner in which changes to one part of a model are constrained, or dependent, on the shapes of other parts of a model.

Model-based segmentation has been used in various applications to segment one or multiple target organs from medical images, see for example, the paper by Ecabert, O., et al. 2008 entitled "*Automatic Model-Based Segmentation of the Heart in CT Images*"; IEEE Trans. Med. Imaging 27 (9), 1189-1201. The use of triangulated surface meshes has led to MBS generally providing smooth segmentation results. Furthermore, MBS is generally considered to be robust against image artifacts, such as variations in image quality.

Another segmentation method uses machine learning (ML) models to convert an image into a plurality of constituent shapes (e.g. block shapes or block volumes), based on similar pixel/voxel values and image gradients. This is described, for example, in the paper by Long et al. entitled: "*Fully Convolutional Networks for Semantic Segmentation*".

It is an object of embodiments herein to improve upon these methods.

SUMMARY OF THE INVENTION

As noted above, two common methods of image segmentation include model-based segmentation MBS and machine learning ML segmentation. MBS contains prior shape knowledge in the mesh (e.g. is shape constrained) as only certain Eigenmodes of mesh deformation are permitted during the fitting process. This may generally lead to an accurate fit consistent with typical shapes associated with the object being segmented. For example, if the MBS model is of a heart, only permitted deformations resulting in heart shapes observed in real human populations may be permitted. However edge cases, whereby the model needs to be deformed towards the limit of the model's permitted range may result in spurious fits.

By comparison, machine learning (ML) approaches work on a voxel-wise basis and thus are generally not shape constrained. As a result they may fit any shape, however the accuracy may be less due to the lack of prior shape knowledge. This can also lead to non-smooth or leaking segmentation results.

It is an object of embodiments herein to improve on such methods to provide improved segmentation, particularly for edge cases which may be poorly treated by MBS models.

Thus according to a first aspect herein there is a method of segmenting a feature in an image. The method comprises providing an image product related to the image to a model trained using a machine learning process, receiving from the model an indication of a shape descriptor for the features in the image, based on the image product, and using the indicated shape descriptor in a model based segmentation, MBS, to initialize the MBS and segment the feature.

In this way, a model trained using a machine learning process may be used to predict one or more shape descriptors for use in initializing an MBS model. In this way, as will be explained in more detail below, the coarse segmentation results of, for example, a ML model may be used to initiate a more accurate MBS segmentation.

According to a second aspect there is a method of training a machine learning model for use in a segmentation process for segmenting a feature in an image. The method comprises obtaining training data, the training data comprising: i) example image products, each example image product being related to a respective image and ii) corresponding ground truth shape descriptors for the feature in each example image product; and training the model to predict new shape descriptors for a new image product, based on the training data.

According to a third aspect there is a system for segmenting a feature in an image. The system comprises a memory comprising instruction data representing a set of instructions and a processor configured to communicate with the memory and to execute the set of instructions. The set of instructions, when executed by the processor, cause the processor to: provide an image product related to the image to a model trained using a machine learning process; receive from the model an indication of a shape descriptor for the feature in the image, based on the image product; and use the indicated shape descriptor in a model based segmentation, MBS, to initialize the MBS and segment the one or more features.

According to a fourth aspect there is a system for training a machine learning model for use in a segmentation process for segmenting a feature in an image. The system comprises a memory comprising instruction data representing a set of instructions and a processor configured to communicate with the memory and to execute the set of instructions. The set of instructions, when executed by the processor, cause the processor to: obtain training data, the training data comprising: i) example image products, each example image product being related to a respective image and ii) corresponding ground truth shape descriptors for the feature in each example image product; and train the model to predict new shape descriptors for a new image product, based on the training data.

According to a fifth aspect there is a computer program product comprising computer readable medium comprising a computer readable medium, the computer readable medium having computer readable code embodied therein, the computer readable code being configured such that, on execution by a suitable computer or processor, the computer or processor is caused to perform any of the embodiments of the methods of the first or second aspects.

BRIEF DESCRIPTION OF THE DRAWINGS

For a better understanding and to show more clearly how embodiments herein may be carried into effect, reference will now be made, by way of example only, to the accompanying drawings, in which.

DETAILED DESCRIPTION OF EMBODIMENTS

As described briefly above, machine learning, ML, segmentation whereby a machine learning model is trained to convert an image into its constituent shapes based on pixel/voxel values and image gradients may segment any image with some accuracy, however this method may be limited in that ML segmentation is generally not constrained by prior shape knowledge. This may lead to non-smooth or leaking segmentation results.

Conversely, although model based segmentation, MBS, may provide highly accurate segmentation due to the incorporation of prior shape knowledge, MBS models may provide poor quality (or erroneous) fits when the objects they are fitting have shapes towards the extremes of the permitted deformation modes of the model.

It is an object of embodiments herein to provide improved methods and systems for segmenting images.

Figure 1:
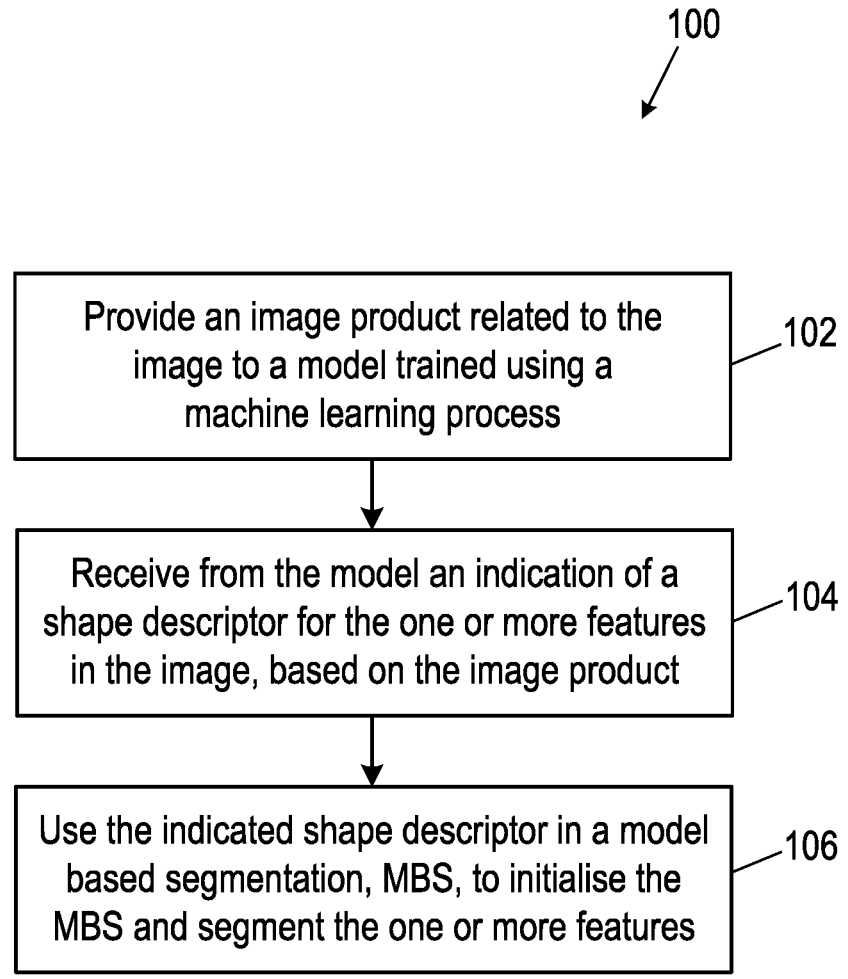
FIG. 1 shows a method according to some embodiments herein.

FIG. 1 shows a method 100 of segmenting a feature in an image according to some embodiments herein. In a first block 102, the method 100 comprises providing an image product related to the image to a model trained using a machine learning process. In a second block 104, the method comprises receiving from the model an indication of a shape descriptor for the feature in the image, based on the image product. In a third block, 106 the method comprises using the indicated shape descriptor in a model based segmentation, MBS, to initialize the MBS and segment the feature.

Using a model (such as a machine learning model) in this way to predict approximate shape descriptors for use in initializing a MBS model, may allow the MBS model to produce a more accurate fit. For example, when the anatomical shape is "too extreme" and therefore outside the MBS capture range, the MBS hierarchical adaptation yields the best model fit within the capture range (this might be thought of as a local minimum fit solution).

Hence, if we can better initialize the model (for example by using shape descriptors from a ML algorithm as explained in herein) the "extreme" anatomical geometry—which was outside the capture range when not using the ML shape descriptors—becomes capturable (put another way, the global minimum of the fitting algorithm may be found).

In more detail, the image (e.g. the image that is to be segmented) may be any type of image. In some embodiments, the image may comprise a scientific image. In some embodiments, for example, the image may comprise a medical image.

A medical image may comprise an image acquired using any imaging modality. Examples of a medical image include, but are not limited to, a computed tomography (CT) image (for example, from a CT scan) such as a C-arm CT image, a spectral CT image or a phase contrast CT Image, an x-ray image (for example, from an x-ray scan), a magnetic resonance (MR) image (for example, from an MR scan), an ultrasound (US) image (for example, from an ultrasound scan), fluoroscopy images, nuclear medicine images, or any other three dimensional medical image.

More generally, the image may comprise an image captured using a charged coupled device CCD, such as that in a camera. The skilled person will appreciate that embodiments herein may be applied to other types of images and/or other data sets that may be segmented.

Generally the image may comprise a two dimensional image or a three dimensional image. The image may comprise a plurality (or set) of image components. For example, in embodiments where the image comprises a two dimensional image, the image components may comprise pixels. In embodiments where the image comprises a three dimensional image, the three dimensional image, the image components may comprise voxels.

The feature in the image may comprise any object (e.g. real or simulated), shape or part of an object or shape thereof that is visible (e.g. discernable) in the image. In embodiments where the image comprises a medical image, the feature may comprise an anatomical feature, or portion thereof, such as part of a lung, heart, brain, or any other anatomical feature.

Turning to blocks 102 and 104 of method 100 ("providing an image product related to the image to a model trained using a machine learning process" and "receiving from the model an indication of a shape descriptor for the one or more features in the image, based on the image product"); in embodiments herein a machine learning model is used to predict one or more shape descriptors for a feature in the image that may be used by a MBS model to initialize the MBS model.

As will be described in more detail below, the machine learning model may predict the shape descriptors based on, for example, the image itself, or a segment output by an initial segmentation, performed, for example, by another type of segmentation process, such as a machine learning segmentation process. In this way an initial coarse segmentation may be used by a machine learning model (such as a neural network) to predict parameters that may be used to initialize an MBS model. In this way a more accurate segmentation may be performed by the MBS model.

The model may comprise any type of model, such as, for example, a model trained using a machine learning process. Examples of models that may be used herein include, but are not limited to neural network models such as deep learning neural networks, and random forest models.

The skilled person will be familiar with neural networks, but in brief, neural networks are a type of supervised machine learning model that can be trained to predict a desired output for given input data. Neural networks are trained by providing training data comprising example input data and the corresponding "correct" or ground truth outcome that is desired. Neural networks comprise a plurality of layers of neurons, each neuron representing a mathematical operation that is applied to the input data. The output of each layer in the neural network is fed into the next layer to produce an output. For each piece of training data, weights associated with the neurons are adjusted until the optimal weightings are found that produce predictions for the training examples that reflect the corresponding ground truths.

Although examples of neural networks are provided herein, the skilled person will appreciate that generally the trained model may comprise any model that may be trained to take as input an image product and output (e.g. predict) an indication of a shape descriptor for one or more features in the image.

In some embodiments, the image product related to the image may comprise the image itself. For example, the image product related to the image may comprise a portion of the image (e.g. the whole or part of the original image). In other words, in some embodiments, a model may be used to predict shape descriptors for a feature in an image, based on the image itself (e.g. taking the image as input). In other examples, the image product may comprise a portion of the image (e.g. the whole or part of the original image) having undergone a pre-processing process. Examples of pre-processing processes include, but are not limited to, for example, smoothing or filtering the image in order to accentuate the feature (or smooth the background noise).

In some embodiments, the image product provided to the model may comprise a segment produced by another pixel or voxel-based segmentation (e.g. a segmentation process that produces as outcome segments comprising pixels or voxels (in 2D or 3D respectively.) In other words, in some embodiments, a model may be used to predict shape descriptors for a feature in an image, based on a segment produced in an initial segmentation of the image. The initial segmentation may be a coarse (e.g. approximate or quick) segmentation.

In some embodiments, the image product provided to the model may comprise a segment produced by an ML based segmentation process. In some embodiments, the ML based segmentation process may comprise a volumetric ML based segmentation process. Generally, the ML based segmentation process may comprise any Machine learning methods for semantic image segmentation (2D or 3D segmentation). The skilled person will be familiar with ML segmentation processes. An example of such a process is provided in the aforementioned paper by Long et al. entitled: "*Fully Convolutional Networks for Semantic Segmentation*".

The method may thus further comprise performing an initial segmentation of the image using a machine learning, ML, based segmentation process. A segment from the initial segmentation performed by the ML based segmentation process may then be provided as input to the model from which the model may output or predict the indication of the shape descriptor.

It is further noted that in some embodiments, both the original image (or a preprocessed version thereof) and a segment produced by an initial segmentation may be provided to the model trained using a machine learning process, in order for the model to predict the shape parameters. In other words, in some embodiments the model may take as input the image and a segment produced by a ML segmentation algorithm.

Figure 2:
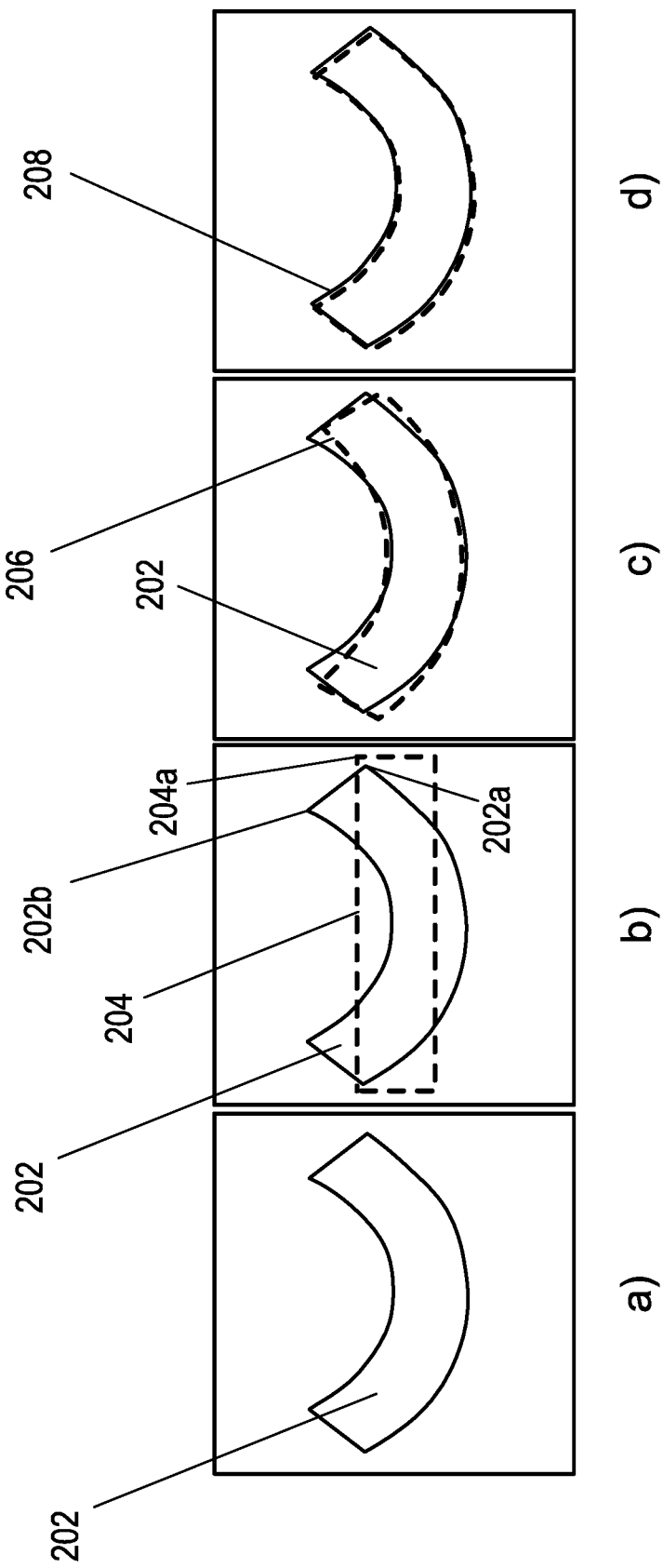
FIG. 2 illustrates an embodiment of the method 100.

This is illustrated in FIG. 2 which shows an embodiment whereby a deep learning (DL) neural network is used to estimate an organ shape descriptor from a volumetric ML-based segmentation result of a segmentation performed on a medical image.

In this example, the feature to be segmented comprises a slice through a simulated 3D cylinder that is bent upwards towards the top of the image. In this embodiment, the image slice is segmented by a ML segmentation process to produce a segment 202 for the cylinder as shown in FIG. 2a.

FIG. 2b shows an outline for an MB S model 204 of a cylinder, overlain onto the segment. In this embodiment, the cylinder 202 is deformed towards the limit of the permitted deformation of the model 204. If the MBS model is applied to this cylinder, a poor (or erroneous) fit may be produced, for example, the corner of the model labelled 204a in FIG. 2 may erroneously fit to the corner 202a of the cylinder, instead of the correct corner 202b.

However, according to embodiments herein, the segment 202 produced by the ML segmentation process is provided as input to a deep learning neural network and the deep learning neural network outputs or predicts an indication of a shape descriptor for the feature in the image, based on the segment 202.

The shape descriptor is provided to the MBS-based model mesh as an input parameter to initialize the MBS mesh by aligning (e.g. roughly) the shape of the mean model mesh with the shape of the ML result. This is shown in FIG. 2c, which shows the initialized MBS mesh 206 when initialized using the shape descriptors. Now the MBS mesh is almost aligned with the object, and local MBS fine segmentation can be applied to the original image (in the classical/normal way) to provide a more accurate segmentation 208 of the object, the result of which is shown in FIG. 2d.

In this way, a model such as a deep learning (DL) model can estimate an approximate deformation to initialize an MBS mesh from a segment produced by an ML segmentation. This may avoid the aforementioned problems associated with using MBS models when segmenting shapes towards the extremes of the MBS model deformation. This combines the strengths of ML (providing a coarse segmentation, whatever the shape) and MBS segmentation process (highly accurate segmentation when initialized correctly) to provide an overall improved segmentation process.

Turning back now to the method 100, in some embodiments, the model may be trained to predict the indication of the shape descriptor based on training data comprising: i) example image products and ii) corresponding ground truth shape descriptors for each example image product. For example, a training data set may be compiled comprising example image products and "correct" or desired outputs for each example input image. Further detail on the training is provided below, with respect to FIG. 4.

In some embodiments, the shape descriptors may comprise one or more parameters that may be used (e.g. input) to a MBS model in order to initialize the MBS model. For example, by aligning a shape of a mean model mesh associated with the MBS to a shape of the one or more segments produced by the Volumetric ML based segmentation process, according to the indicated shape descriptor.

Generally, the shape descriptor(s) may comprise one or more weights or eigenvalues that may be used to initialize the shape of the model. In some embodiments, shape descriptors may describe offsets of the individual vertices in the MBS model. In some embodiments, the shape descriptor may define an affine transformation (or a set of affine transformations) which are applied to portions of the mesh with proper boundary conditions so that pathological mesh deformations (such as self-intersections) occur. These are merely examples, however and the skilled person will be familiar with other ways that an MBS model may be initialized and thus other forms that a shape descriptor may take in order to implement the embodiments herein.

As noted above, the indication of a shape descriptor may comprise one or more values that may be used to initialize the MBS model. In some embodiments, the indication of a shape descriptor may comprise one or more values or classifications from which the shape descriptors may be determined or calculated. In some examples, the values may be continuous values. In other examples, the values may be discretized. Thus, generally, the neural network based estimation of the shape descriptor can be treated as a regression or a classification task.

In some embodiments, the model comprises a regression neural network. In this sense, the shape descriptor(s) output by the neural network may be in the form of continuous values.

As an example, in one embodiment, the ML-based segmentation is provided as a 3D volume containing integer class labels (e.g. each voxel in the volume may be labelled 1 or 0 indicating that the voxel forms part of the segmented volume or not part of the segmented object). In this embodiment, the MBS model shape descriptors, $\omega$, correspond to n-dimensional real valued vectors. Note that, as described above, this parametrization $\omega$ could represent the deformation of the original model shape in different ways, e.g. by describing offsets of the individual vertices (in which case the dimensionality of $\omega$ would be quite high) or by describing a set of affine transformations which are applied to portions of the mesh with proper boundary conditions so that pathological mesh deformations (like self-intersections) occur; in the latter case the parametrization vector $\omega$ would have a lower number of dimensions, which may simplify the estimation task.

In this embodiment, a regression network N is used in order to estimate a shape descriptor $\hat{\omega}=N(I)$ from a segmentation image volume I. Put another way, I comprises a segment output from an ML segmentation process as described above with respect to FIG. 2. As is typical in classic regression analysis, in this embodiment, a network architecture parametrized by a vector $\theta$ as well as a loss functional L is used. Given a training set T containing pairs of segmentation volumes and associated shape descriptors, the optimal network parametrization $\theta^*$ may be obtained by minimizing the average loss across the training data, i.e. by solving the optimization task:

$$\underset{\theta}{\text{minimize}}\; \underset{I,\omega\in T}{\text{mean}}\, L(N_\theta(I), \theta, \omega).$$

Figure 3:
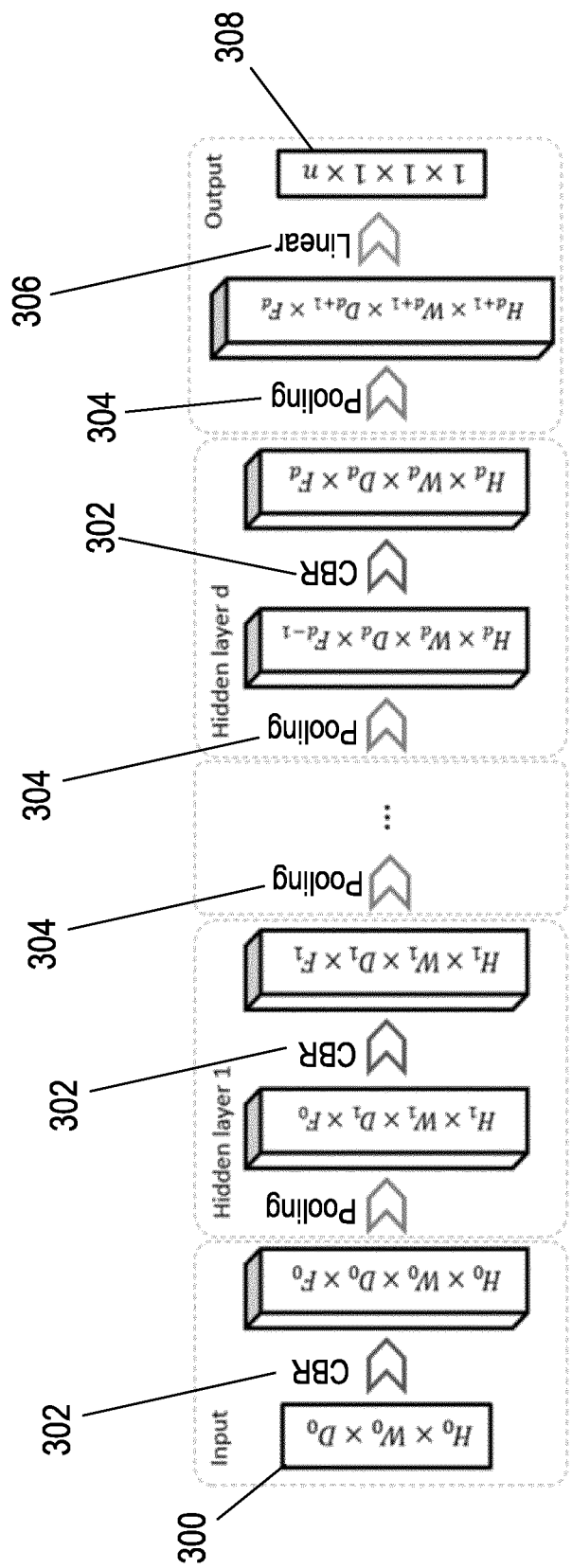
FIG. 3 is an example architecture of a model according to some embodiments.

An example network architecture is illustrated in FIG. 3. In this example, the network comprises three different types of layer modules, Convolution, Batch normalization, Rectified linear unit, (CBR) blocks 302, pooling layers 304 and a linear layer 306. An input layer 300 receives the input image and an output layer 308 provides the prediction of the shape descriptor(s). A CBR block consists of a 3×3×3 padded convolution (C), followed by batch normalization (B) and a leaky rectified linear unit activation (R). For pooling we choose 2×2×2 average pooling with stride 2 which reduces the spatial tensor dimension by a factor of 0.5 in each step, i.e. $(H_m, W_m, D_m)=0.5*(H_{m-1}, W_{m-1}, D_{m-1})$. The network weights may be trained on mini-batches using a regularized L2 loss with prominent update rule such as SGD, AdaDelta or Adam. The hyper-parameters of this training setup, in particular the number of hidden layers d and the number of feature channels $F_m$ produced by the convolutions, may vary according to the particular application. As a preprocessing step, the input segmentation volumes are resampled, padded and cropped such that their spatial extension match the shape of the network input tensor.

In this way, a regression deep neural network may be used to predict values for the shape descriptors directly.

It is noted that in some embodiments, prior statistical knowledge of the distribution of shape descriptors across the training set may be incorporated into the loss functional. For example, strong deviations from the mean shape descriptor vector may be penalized. This reduces the probability of the network producing very "unlikely" shape descriptors. This may be thought of as similar to Bayesian optimization in the sense that the prior imposed on the shape descriptor distribution may introduce a bias but reduce the variance.

Turning now to classification approaches, in some embodiments, the model comprises a classification neural network. In such embodiments, output indications of shape descriptors are partitioned into discrete values. In other words, the shape descriptor(s) output by the neural network may be discretized. This may reduce the computing power needed to perform the method.

For example, instead of directly relating a segmentation volume I to a shape descriptor via a learned regression model, a neural network can be used to predict upper and lower bounds for each component of the associated shape descriptor.

As an example, the following approach may be used:

Given a ground-truth dataset S containing pairs of segmentation volumes and shape descriptors (I, $\omega$), a partition of $R^n$ may be determined based on the distribution of the shape descriptor vectors.

For illustration, consider the following example: Based on the empirical mean $$\overline{\omega} = \frac{1}{|S|}\Sigma_{(I,\omega)\in S}\omega,\; R^n$$

may be decomposed into $2^n$ disjoint sets of the type $\{w\in R^n: w_1<\overline{\omega}_1,\; w_2>\overline{\omega}_2,\; \ldots,\; w_n<\overline{\omega}_n\}$ by iterating over all possible combinations of the ">" and "<" relations.

After choosing a decomposition $R^n=\cup_i C_i$, each shape descriptor contained in the ground-truth dataset may be assigned a class label based on the associated partition element, i.e. the shape descriptor $\omega$ is assigned the label $l_\omega:=i$ if $\omega$ is contained in $C_i$.

The resulting image label pairs (I, $l_\omega$) serve as training data for a classification network. Solving classification tasks with neural networks as been intensively discussed in the literature, and thus the skilled person will be familiar with possible network specifications and training regimes.

The neural network obtained following the steps outlined above may be applied to an unseen segmentation volume in order to predict the partition element $C_i$ containing the associated shape descriptor. Taking the barycenter of the partition element or randomly sampling from a distribution concentrated on $C_i$, we obtain an explicit shape descriptor estimate which can be used for MBS initialization.

Put more formally, in some embodiments, receiving from the model an indication of a shape descriptor may comprise receiving from the classification neural network a partition element associated with the partitioned discrete values. The partition element may represent an upper or lower limit of the shape descriptor for the feature in the image.

In embodiments where a partition element for the shape descriptor is received from the model, (e.g. as opposed to a value), the method may comprise converting the partition element into a value or other form that may be used to initialize the MBS model. In some embodiments the method may further comprise determining the shape descriptor for the feature in the image from the partition element by determining a barycenter of the partition element and using the barycenter as the shape descriptor for the feature. Alternatively the method may further comprise determining a shape descriptor estimate based on a random sampling of a distribution centered on the partition element and using the shape descriptor estimate as the shape descriptor for the feature.

Turning back to method 100, the block 106 of using the indicated shape descriptor in a model based segmentation, MBS, to initialize the MBS and segment the feature, may comprise, initializing the MBS model using the shape descriptor and performing a segmentation on the image, using the initialized MBS model. For example, the shape descriptors may be provided to the MBS model as input parameters to perform the segmentation on the image (e.g. the original or preprocessed image).

This approach may overcome some of the downsides of MBS (out of range boundaries in case the image's target organ shape deviates strongly from the model's shape) and ML segmentation (no shape regularization) by using a model to predict shape predictors from an ML segment that can be used to initialize an MBS model. In this way the two approaches may be used in tandem to produce an improved outcome. It may be applied to any voxel-based segmentation, such as a rough volumetric organ segmentation, in particular also to those generated by ML algorithms.

In some embodiments, as described above, the proposed algorithm estimates a shape descriptor from the ML result and maps that descriptor onto the MBS model, which effectively deforms the model's mean mesh shape to approximately align with the ML result. Consequently, MBS is only applied locally for fine-tuning the segmentation result, thus also simplifying complex multi-level model hierarchies which are currently employed in many cases. This method may overcome the general problem of MBS approaches to require good initializations so that the model is well within the capture range of the organ boundaries to be detected.

Figure 4:
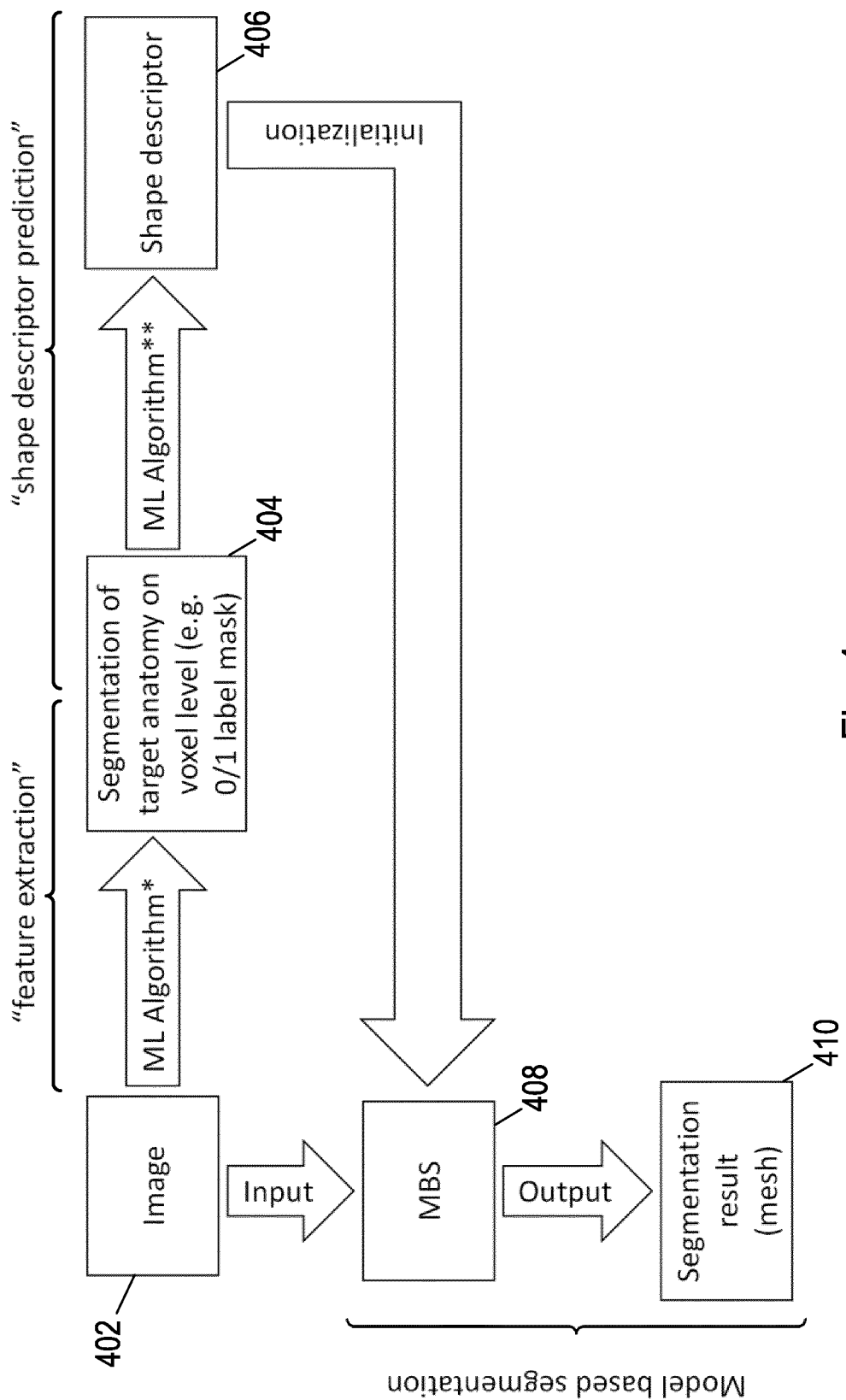
FIG. 4 illustrates an example method according to some embodiments herein.

A further embodiment is illustrated in FIG. 4 which shows a summary of a method whereby a machine learning segmentation process is used to produce a segment that is provided as input to a (second) model trained using a machine learning process. The model uses the segment produced by the machine learning segmentation process to predict a shape descriptor for use in initializing a MBS.

The method starts at block 402 where the image is provided to a machine learning segmentation model (labelled ML Algorithm* in FIG. 4) which segments the image and produces one or more segments of features in the image at block 404. This machine learning segmentation model operates on the original image data and derives a segmentation of the image on a voxel/pixel-level.

A segment output by the machine learning segmentation model is provided as input to a model trained using a machine learning process (labelled ML Algorithm** in FIG. 4). This model may comprise a neural network, for example, and uses the segment to predict or estimate a shape descriptor (406) for the segment.

The predicted/estimated shape descriptor is used to initialize a model based segmentation process, MBS 408. The MBS 408 takes as input the image 402 and the shape descriptors 406. The shape descriptors are used to initialize the MBS. The model based segmentation produces a segmentation (mesh-based) output.

In another embodiment, the model trained using a machine learning process (e.g. ML Algorithm** in FIG. 4) may further take the original image as input. E.g. a neural network may be used to predict shape predictors based on a segmentation from a ML-based segmentation and the original image.

Figure 5:
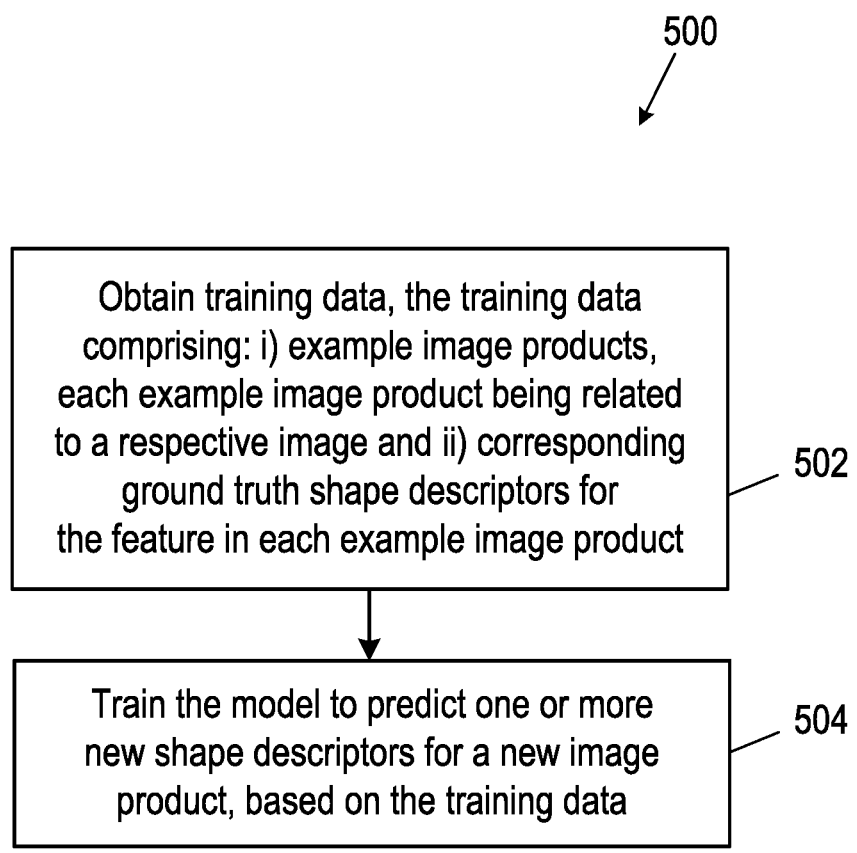
FIG. 5 shows another method according to some embodiments herein.

Turning now to FIG. 5, in some embodiments there is a method 500 of training a machine learning model for use in a segmentation process for segmenting a feature in an image. Briefly, the method comprises in a first block 502, obtaining training data, the training data comprising: i) example image products, each example image product being related to a respective image and ii) corresponding ground truth shape descriptors for the feature in each example image product. In a second block 504 the method comprises training the model to predict new shape descriptors for a new image product, based on the training data.

The image and feature therein may comprise any type of image and any type of feature, including the types of images and features described above with respect to the method 100. Furthermore the model may comprise any type of model suitable for predicting a shape descriptor from an image product, as described above with respect to the method 100. The details and embodiments of the model described above with respect to FIG. 1-3 will be understood to apply equally to embodiments of the method 500.

Block 502 of obtaining training data, may comprise obtaining example image products, each example image product being related to a respective image and annotating the obtained example image products with corresponding ground truth ("correct") shape descriptors for the feature in each example image product.

As noted above, the image products may comprise images or products derived from images. In some embodiments, as described in detail above, the image products may comprise segmentations produced by, for example, an ML segmentation process.

The training data may comprise many training examples. Generally, as will be appreciated by the skilled person, the accuracy of the model at predicting shape descriptors may be improved with increasingly large training sets. Thus in some embodiments, the training data may comprise hundreds, or even thousands of training examples.

As described in detail above with respect to the method 100, in some embodiments, the model may comprise a classification neural network. In such embodiments, the ground truth values may be discretized. As such, the method 500 may further comprise partitioning the values of the ground truth shape descriptors in the training data into discrete values. Training 504 the model to predict shape descriptors for a new image product may then comprise training the model to predict the new partition values of the shape descriptors for a new image product, based on the training data.

In some embodiments, the partition values represent upper or lower bounds for the shape descriptors. As described above with respect to the method 100, such upper or lower bounds may be used to determine values for the shape partitions that may be used to initialize the MBS model, for example, by determining a barycenter of the partition element and using the barycenter as the shape descriptor for the feature, or determining a shape descriptor estimate based on a random sampling of a distribution centered on the partition element and using the shape descriptor estimate as the shape descriptor for the feature. As described in detail above, the one or more new shape descriptors are for use in initializing a model based segmentation, MBS, for segmentation of the new image.

Figure 6:
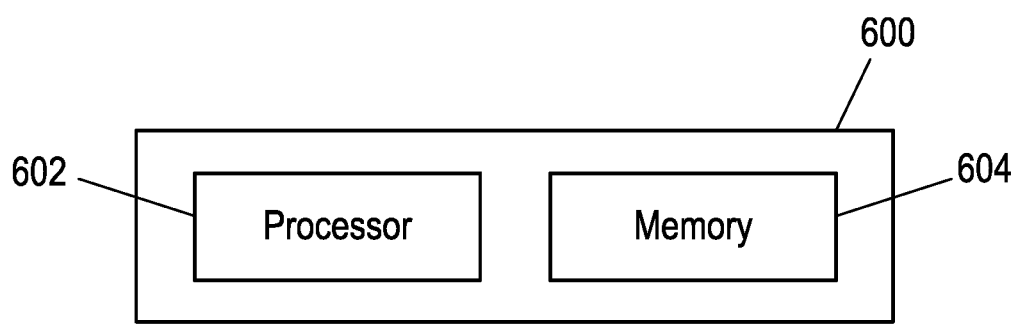
FIG. 6 shows a system according to some embodiments herein.

Turning now to FIG. 6 in some embodiments there is a system 600 for displaying a three dimensional volume of an image on a two dimensional display. The system may form part of specialized equipment, such as specialized medical equipment, alternatively, the system may form part of a computer system e.g. such as a laptop, desktop computer or other device, or the system 600 may form part of the cloud/a distributed computing arrangement.

The system comprises a memory 604 comprising instruction data representing a set of instructions and a processor 602 configured to communicate with the memory and to execute the set of instructions. Generally, the set of instructions, when executed by the processor, may cause the processor to perform any of the embodiments of the methods 100 or 500 as described above. In some implementations, the set of instructions can comprise a plurality of software and/or hardware modules that are each configured to perform, or are for performing, individual or multiple steps of the method described herein.

More specifically, in some embodiments, the set of instructions, when executed by the processor, cause the processor to, provide an image product related to the image to a model trained using a machine learning process, receive from the model an indication of a shape descriptor for the feature in the image, based on the image product, and use the indicated shape descriptor in a model based segmentation, MBS, to initialize the MB S and segment the one or more features.

Providing an image product related to the image to a model trained using a machine learning process, receiving from the model an indication of a shape descriptor for the feature in the image, based on the image product, and using the indicated shape descriptor in a model based segmentation, MBS, to initialize the MBS and segment the one or more features, were described in detail with respect to the method 100 and blocks 102, 104 and 106 and the detail therein will be understood to apply equally to the configuration of the system 600.

In other embodiments, the set of instructions, when executed by the processor, cause the processor to: obtain training data, the training data comprising: i) example image products, each example image product being related to a respective image and ii) corresponding ground truth shape descriptors for the feature in each example image product; and train the model to predict new shape descriptors for a new image product, based on the training data.

Obtaining training data and training the model to predict new shape descriptors for a new image product, based on the training data were described in detail above with respect to the method 500 and the detail therein will be understood to apply equally to the system 600.

In any of the embodiments of the system 600, the processor 602 can comprise one or more processors, processing units, multi-core processors or modules that are configured or programmed to control the system 600 in the manner described herein. In particular implementations, the processor 602 can comprise a plurality of software and/or hardware modules that are each configured to perform, or are for performing, individual or multiple steps of the method described herein. The processor 602 can comprise one or more processors, processing units, multi-core processors and/or modules that are configured or programmed to control the system 600 in the manner described herein. In some implementations, for example, the processor 602 may comprise a plurality of (for example, interoperated) processors, processing units, multi-core processors and/or modules configured for distributed processing. It will be appreciated by a person skilled in the art that such processors, processing units, multi-core processors and/or modules may be located in different locations and may perform different steps and/or different parts of a single step of the method described herein.

The memory 604 is configured to store program code that can be executed by the processor 102 to perform the method described herein. Alternatively or in addition, one or more memories 604 may be external to (i.e. separate to or remote from) the system 600. For example, one or more memories 604 may be part of another device. Memory 604 can be used to store the image, image product, model, shape descriptor, segment, information and/or data received, calculated or determined by the processor 602 of the apparatus 600 or from any interfaces, memories or devices that are external to the system 600. The processor 602 may be configured to control the memory 604 to store the image, image product, model, shape descriptor, segment, information and/or data received, calculated or determined.

In some embodiments, the memory 604 may comprise a plurality of sub-memories, each sub-memory being capable of storing a piece of instruction data. For example, at least one sub-memory may store instruction data representing at least one instruction of the set of instructions, while at least one other sub-memory may store instruction data representing at least one other instruction of the set of instructions.

In some embodiments, the system 600 may further comprise a display for displaying/rendering the image, the image product, the MBS model and/or any other information input to or output from (e.g. determined/calculated) by the system 600. The display may comprise, for example, a computer screen, a screen on a mobile phone or tablet, a screen forming part of a medical equipment or medical diagnostic tool, a screen forming part of goggles or a visor associated with a virtual reality display, or any other display.

The system may further comprise a user input, such as a keyboard, mouse or other input device that enables a user to interact with the system, for example, to provide initial input parameters to be used in the method described herein.

It will be appreciated that FIG. 6 only shows the components required to illustrate this aspect of the disclosure and, in a practical implementation, the system 600 may comprise additional components to those shown. For example, the system 600 may comprise a battery or other power supply for powering the system 600 or means for connecting the system 600 to a mains power supply.

In another embodiment, there is provided a computer program product comprising a computer readable medium, the computer readable medium having computer readable code embodied therein, the computer readable code being configured such that, on execution by a suitable computer or processor, the computer or processor is caused to perform the method or methods described herein.

Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of segmenting a feature in an image, the method comprising:
   providing an image product, related in whole or in part to the image, to a model trained using a machine learning process, wherein the model has been trained to predict an indication of a shape descriptor based on training data comprising: example image products and corresponding ground truth shape descriptors for the example image products;
   receiving from the model an indication of a shape descriptor for the feature in the image, based on the image product;
   using the indicated shape descriptor in a model based segmentation (MBS) to initialize the MBS and segment the feature; and
   using a mesh of a target structure that is adapted in an iterative fashion to features in the image.

2. The method of claim 1, wherein the image product related to the image comprises one of:
   a portion of the image; or
   a portion of the image having undergone pre-processing.

3. The method of claim 1, wherein the model has been trained using a machine learning process comprising a neural network.

4. The method of claim 1, wherein the model has been trained using a machine learning process comprising a regression neural network.

5. The method of claim 1, wherein the method comprises:
   performing an initial segmentation of the image using a machine learning (ML) based segmentation process; and
   wherein the image product provided to the model comprises a segment produced by the ML based segmentation process.

6. The method of claim 5, wherein using the indicated shape descriptor in a MBS comprises:
   initializing the MBS by aligning a shape of a mean model mesh associated with the MBS to a shape of the segment produced by the ML based segmentation process, using the indicated shape descriptor.

7. The method of claim 1, wherein the model has been trained using a machine learning process comprising a classification neural network wherein output indications of shape descriptors are partitioned into discrete values, wherein receiving from the model an indication of a shape descriptor comprises:
   receiving from the classification neural network a partition element associated with the partitioned discrete values and wherein the partition element represents an upper or lower limit of the shape descriptor for the feature in the image.

8. The method of claim 7, wherein the method further comprises:
   determining the shape descriptor for the feature in the image from the partition element by either:
      determining a barycenter of the partition element and using the barycenter as the shape descriptor for the feature; or
      determining a shape descriptor estimate based on a random sampling of a distribution centered on the partition element and using the shape descriptor estimate as the shape descriptor for the feature.

9. The method of claim 1, further comprising:
   obtaining the training data; and
   training the model to predict new shape descriptors for a new image product based on the training data.

10. The method of claim 9, wherein the new shape descriptors are for use in initializing a model based segmentation (MBS) of a respective new image.

11. The method of claim 9, wherein the method further comprises:
   partitioning values of the ground truth shape descriptors in the training data into discrete values representing upper or lower bounds of the ground truth shape descriptors; and
   wherein training the model to predict the new shape descriptors for the new image product comprises:
      training the model to predict partition values of the shape descriptors for the new image product, based on the training data.

12. A system for segmenting a feature in an image, the system comprising:
- a memory comprising instruction data representing a set of instructions; and
- a processor configured to communicate with the memory and to execute the set of instructions, wherein the set of instructions, when executed by the processor, cause the processor to:
  - provide an image product, related in whole or in part to the image, to a model trained using a machine learning process, wherein the model has been trained to predict an indication of a shape descriptor based on training data comprising: example image products and corresponding ground truth shape descriptors for the example image products;
  - receive from the model an indication of a shape descriptor for the feature in the image, based on the image product; and
  - use the indicated shape descriptor in a model based segmentation (MBS) to initialize the MBS and segment the one or more features; and
  - use a mesh of a target structure that is adapted in an iterative fashion to features in the image.

13. The system of claim 12, wherein the set of instructions, when executed by the processor, further cause the processor to:
- obtain the training data; and
- train the model to predict new shape descriptors for a new image product, based on the training data, using the machine learning process.

14. A non-transitory computer readable medium storing instructions that, upon execution by a suitable computer or processor, cause the computer or processor to:
- provide an image product, related in whole or in part to the an image, to a model trained using a machine learning process, wherein the model has been trained to predict an indication of a shape descriptor based on training data comprising: example image products and corresponding ground truth shape descriptors for the example image products;
- receive from the model an indication of a shape descriptor for a feature in the image, based on the image product;
- use the indicated shape descriptor in a model based segmentation (MBS) to initialize the MBS and segment the feature; and
- use a mesh of a target structure that is adapted in an iterative fashion to features in the image.

15. The computer readable medium of claim 14, wherein the image product related to the image comprises one of:
- a portion of the image; or
- a portion of the image having undergone pre-processing.

16. The computer readable medium of claim 14, wherein the use of the indicated shape descriptor in a MBS comprises:
- an initialization of the MBS including an alignment of a shape of a mean model mesh associated with the MBS to a shape of the segment produced by the ML based segmentation process, using the indicated shape descriptor.

* * * * *